Patented July 14, 1936

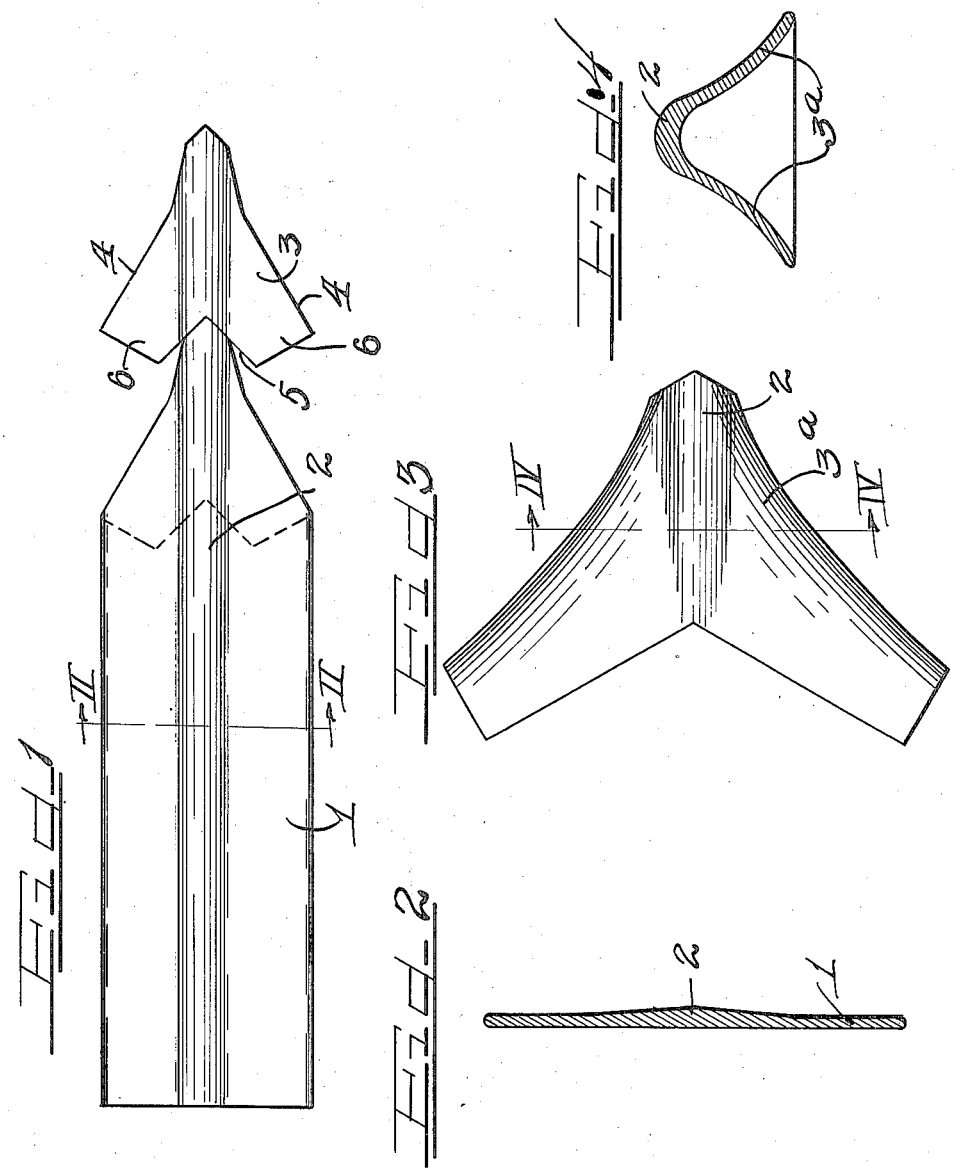

2,047,293

UNITED STATES PATENT OFFICE 2,047,293

METHOD OF MAKING LISTER SHARES

Charles H. Schumacher, Dundee, Ill., assignor to Illinois Iron and Bolt Company, Carpentersville, Ill., a corporation of Illinois Application May 11, 1935, Serial No. 20,927

4 Claims. (Cl. 29—14)

This invention relates to a method of making lister shares.

Heretofore it has been the common practice to reinforce the center portion of lister shares by welding material thereto or upsetting points in order to provide for wear. The forming of the reinforcements and the welding of the same upon the shares required considerable time and labor that had to be added to the cost of production.

It is an object of this invention to simplify the manufacture of such lister shares to avoid the necessity of reinforcing the same by a welding operation or by an upsetting operation.

The invention comprises the novel method or process hereinafter described and more particularly pointed out and defined in the appended claims.

In the accompanying drawing, which illustrates a lister share made in accordance with the method involving this invention and in which similar reference numerals refer to similar features in the different views:

Figure 1 is a plan view of a rolled plate from which the shares are formed.

Figure 2 is an enlarged sectional view through such plate taken upon the line II—II of Fig. 1 looking in the direction of the arrows.

Figure 3 is an enlarged perspective view of a formed lister share.

Figure 4 is an enlarged sectional view taken upon the line IV—IV of Fig. 3.

According to this invention, a plate 1 having a central rib or enlargement 2 is first rolled or suitably formed. The width of the plate is made to suit the size of lister shares desired. From this plate, there are stamped by suitable dies, such sections 3 as are desirable to form lister shares. The sections 3 are preferably stamped with sloping or diverging side edges 4 and a rear re-entrant angle 5 that forms two diverging legs 6. The forward end of the section being cut to a suitable point. The section 3 is cut from the plate so that the rib or enlarged portion 2 will be in the center portion thereof.

The cut or sheared section 3 is then bent into a V-shaped lister share 3a to bring the enlarged portion uppermost as shown in Figs. 3 and 4.

It will be appreciated that in accordance with the foregoing method, the lister share has the proper medial reinforcement when it is formed and requires no welding or upsetting process to reinforce such medial portion.

I am aware that many changes may be made in the method involving this invention and I therefore do not propose limiting the patent granted thereon otherwise than necessitated by the appended claims.

I claim as my invention:

1. The herein described method of making lister shares which consists in forming a plate with a central thickened and longitudinally extending rib, shearing a lister share-like section from one end of said plate whereby a central nose is formed on the remainder of the plate and centrally disposed obtuse angle is formed in the rear end of said section, and bending said section into a substantially U-shaped lister share with the rib uppermost.

2. The herein described method of making lister shares which consists in forming an elongated plate with a longitudinally extending central rib or thickened portion, shearing a blank with a rear inwardly directed centrally located angle therefrom and bending said blank into a V-shaped lister share with the rib uppermost.

3. The herein described method of making lister shares which consists in forming an elongated plate with a central longitudinally extending thickened portion and parallel sides, transversely shearing a blank having substantially symmetrical wing portions from one end of said plate with a centrally inwardly directed angle having its apex at the thickened portion at its rear end and bending said blank into a V-shaped lister share with the thickened portion uppermost.

4. The method of making a plow share which consists in forming a plate with a longitudinally extending central thickened portion, cutting a blank with a central nose and diverging substantially symmetrical wing portions therefrom and bending said blank into a plow share having substantially a U-like cross section with said thickened portion at the bight part thereof.

CHARLES H. SCHUMACHER.